United States Patent [19]
Densley

[11] Patent Number: 5,133,429
[45] Date of Patent: Jul. 28, 1992

[54] SUPPORT PLATFORM FOR VEHICLES

[76] Inventor: Joseph S. Densley, 13757 S. Redwood Rd., Riverton, Utah 84065

[21] Appl. No.: 395,646

[22] Filed: Aug. 18, 1989

[51] Int. Cl.⁵ ............................................. B60R 3/00
[52] U.S. Cl. ...................................... 182/50; 182/92; 182/182; 280/165
[58] Field of Search ........................ 182/150, 92, 152; 280/165

[56] References Cited

U.S. PATENT DOCUMENTS

| | | |
|---|---|---|
| 623,517 | 4/1899 | Carpenter . |
| 1,039,647 | 9/1912 | Carter . |
| 1,938,739 | 12/1933 | Coombes . |
| 2,211,962 | 8/1940 | Morris . |
| 2,378,678 | 6/1945 | Anderson . |
| 2,584,006 | 1/1952 | Finger . |
| 2,856,251 | 10/1958 | Garrison . |
| 2,941,483 | 6/1960 | Lundberg . |
| 3,011,587 | 12/1961 | Mallog . |
| 3,871,480 | 3/1975 | Sauri . |
| 3,961,809 | 6/1976 | Clugston . |
| 4,057,125 | 11/1977 | Kroft . |
| 4,495,883 | 1/1985 | Hoy .................................. 182/150 |
| 4,782,916 | 11/1988 | Hays . |
| 4,800,987 | 1/1989 | Liles . |
| 4,907,674 | 3/1990 | Miller ............................... 182/150 |
| 4,911,264 | 3/1990 | McCafferty ..................... 182/150 |

FOREIGN PATENT DOCUMENTS

| | | |
|---|---|---|
| 213946 | 3/1961 | Austria . |
| 848333 | 8/1970 | Canada . |
| 115258 | 9/1925 | Switzerland . |
| 511417 | 9/1976 | U.S.S.R. . |
| 950874 | 8/1982 | U.S.S.R. . |
| 648441 | 6/1951 | United Kingdom . |
| 1277473 | 6/1972 | United Kingdom . |

Primary Examiner—Reinaldo P. Machado
Attorney, Agent, or Firm—M. Reid Russell

[57] ABSTRACT

A support platform for vehicles having a hanger frame that fits over and is supported by the upper portion of a vehicle wheel and a supported platform carried by the hanger frame and foldable with respect to the frame.

2 Claims, 2 Drawing Sheets a
SUPPORT PLATFORM FOR VEHICLES

BRIEF DESCRIPTION OF THE INVENTION

Background of the Invention

1. Field of the Invention

This invention relates to platform to be mounted on a vehicle wheel and to provide a support for persons needing access to the engine compartment of the vehicle or as a seat.

2. Prior Art

The need for a platform to be mounted on a vehicle wheel so as to provide support for a person desiring access to the engine compartment of a vehicle ksuch as a truck, has been previously recognized. Because of the distance from ground to the top of the engine compartment on many four-wheel drive vehicles, and trucks it is very difficult and often is impossible for a mechanic to reach into the engine compartment to work on a vehicle engine. Even the necessary task of checking the engine oil level is extremely difficult, often requiring the person performing the task to climb onto the vehicle body in some way.

U.S. Pat. Nos. 2,378,678 and 4,782,916, for example, show platforms carried by arms that are adapted to hook over the upper surface of a vehicle tire so that the platform provides an elevated step on which a person may stand while working in an engine compartment of the vehicle. While the use of hooks may be satisfactory for the support platforms disclosed in the aforementioned patents when used with specific sized tires. However, the hooks may slide to one side of the tire and be released from the tire. This is more apt to occur with tires smaller in size than those for which the platform support is specifically designed. Also, the supports described in the aforementioned patents may be suitable for storage and use in a repair garage, but are not sufficiently compact to be readily carried in the vehicle.

Objects of the Invention

Principal objects of the present invention are to provide a platform with a wheel engaging structure adaptable to use with a great many tire sizes and that will positively secure the platform to the wheel, regardless of the wheel size.

Other objects are to provide a platform for use with vehicles that can be used either as a step or as a seat and that is readily folded compactly to be carried in a vehicle and readily opened for use.

Features of the Invention

Principal features of the invention include a hanger frame and an arm supported platform, both pivotally connected to hanger arms by links so that the hanger frame and arm supported platform will be pivoted between folded positions substantially flat against the hanger arms and use positions, extending substantially normal to the hanger arms and solidly abutting the hanger arms.

Other objects and features of the invention will become apparent from the following detailed description and drawing disclosing what are presently contemplated as being the best modes of the invention.

THE DRAWINGS

In the drawings:

FIG. 1 is a perspective view of an automobile tire with the support platform of the invention mounted thereon;

FIG. 2, a side elevation of the support platform of the invention and with the folded position shown in phantom lines FIG. 3, a top plan view; and FIG. 4, an enlarged fragmentary view taken within the line 4—4 of FIG. 2.

DETAILED DESCRIPTION

Figure 1:
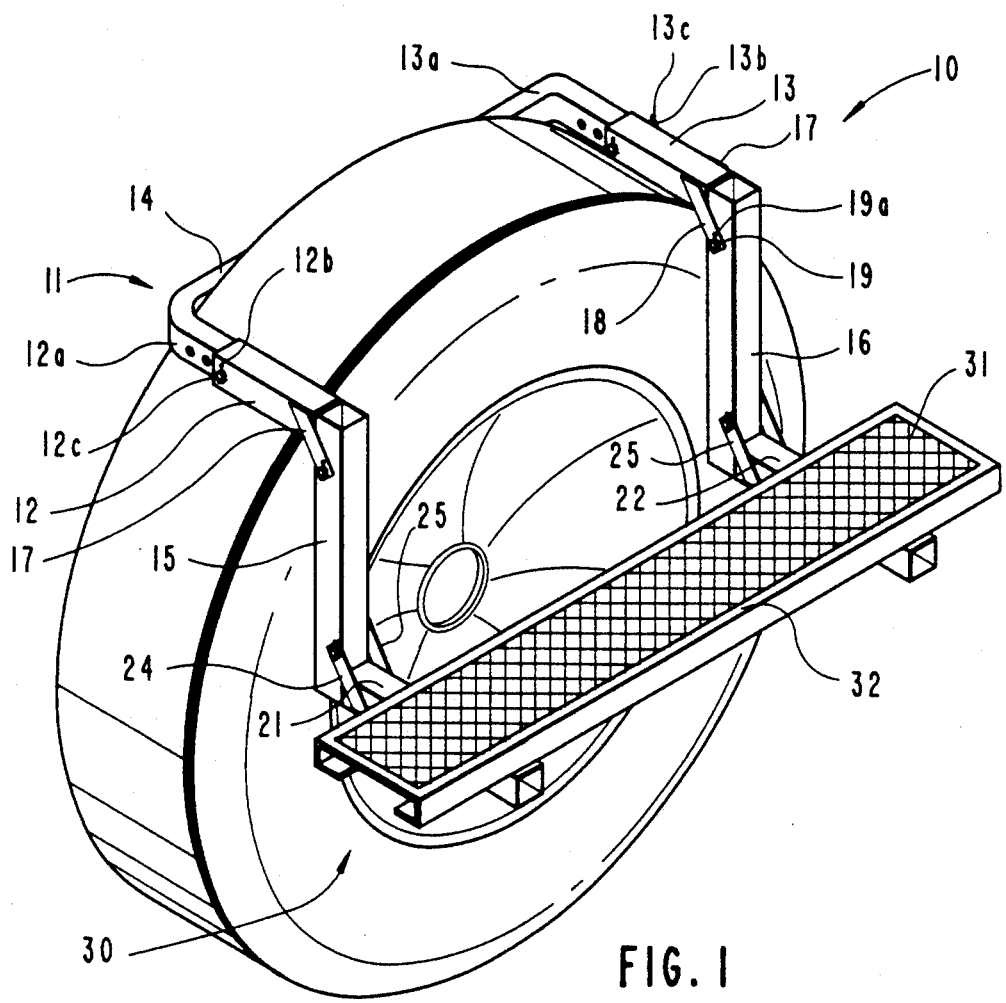
Figure 2:
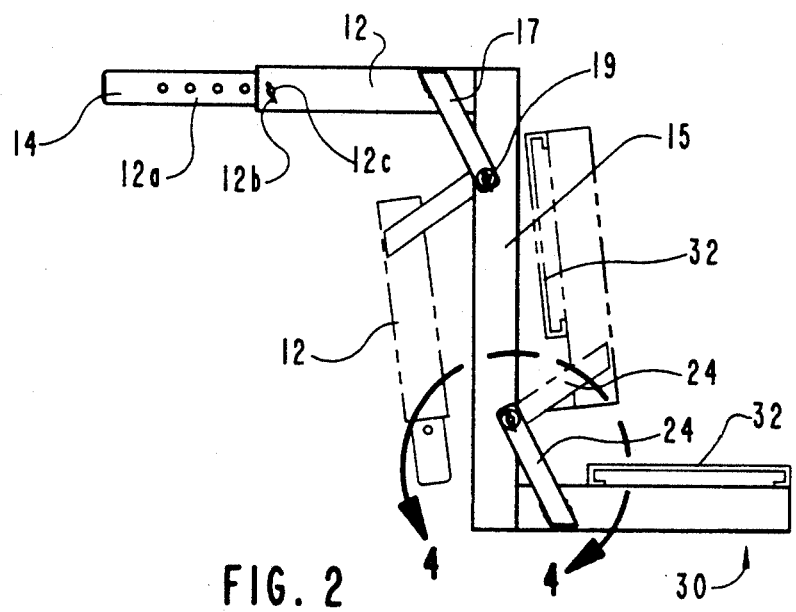
Figure 3:
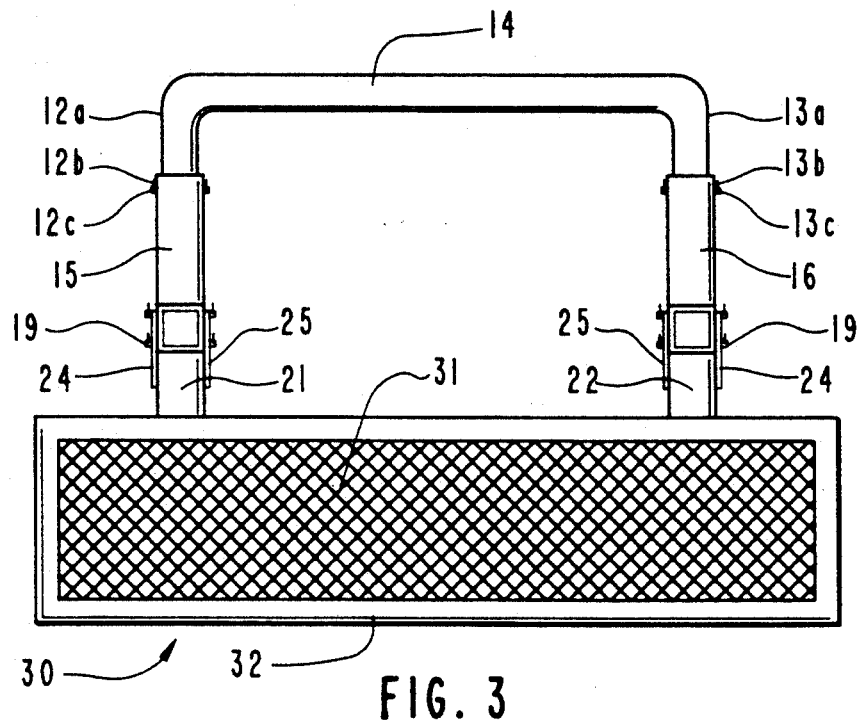
Figure 4:
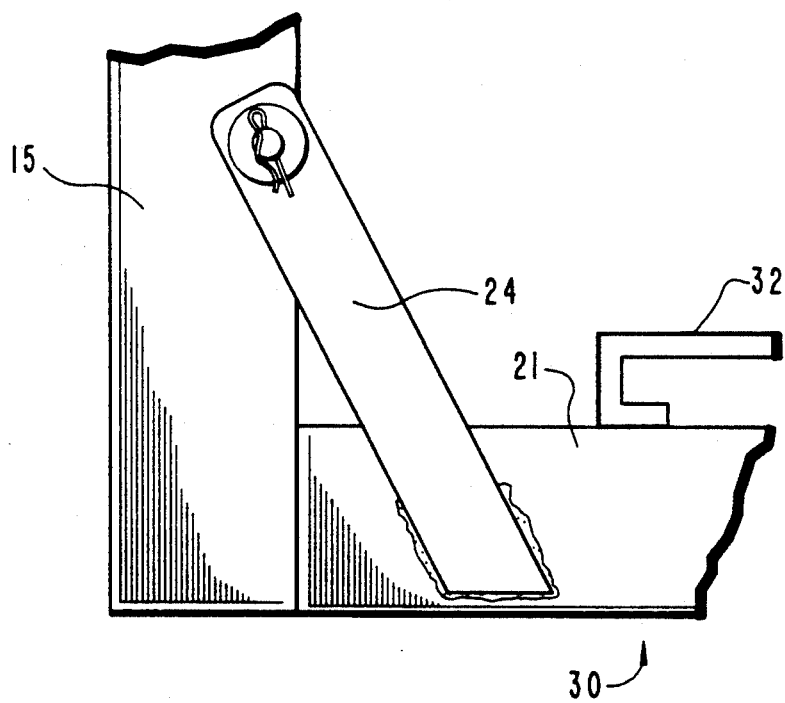

Referring now to the drawings:

In the illustrated preferred embodiment the support platform for vehicles of the invention is shown generally at 10.

As shown, a hanger frame 11 includes a pair of legs 12 and 13, with one end of each of the legs connected to the other leg by a web member 14.

The hanger frame is made of square tubing and the ends of legs 12 and 13 remote from web 14 are cut square to abut against hanger arms 15 and 16, respectively, that are also made of square tubing. A pair of links 17 and 18 fixed, as by welding to opposite sides of the free ends of legs 12 and 13 straddle, and are each pivotally connected to one end of, a hanger arm 15 or 16 by a pivot pin 19. A clip 19a through a hole in the end of the pivot pin 39 holds the pivot pin in place.

The other ends of the hanger arms 15 and 16 have an arm supported platform 20 pivotally connected thereto. The arm supported platform comprises a pair of spaced apart arms 21 and 22 interconnected by a rigid platform 23 that is welded or otherwise affixed across the central portion and one end of each of the arms 21 and 22. The other ends of the arms 21 and 22 each have links 24 and 25 welded, or otherwise affixed, thereto and the links are pivotally attached by pivot pins 26 and 27 to the ends of hanger arms 15 and 16 opposite the ends to which the hanger frame is pivotally attached. A clip pin 29 through the end of each pivot pin 26 and 27 holds the pivot pin in place. The arms 21 and 22 then support a platform 30 that extends across and is welded or otherwise affixed to the arms, the platform may be made of an expanded metal central portion 31, with an outer peripheral frame 32 of angle iron.

The legs 12 and 13 of the hanger frame 11 are spaced apart less than the diameter of the wheel and tire on which the support platform is to be supported.

In use, the support platform 10 is unfolded until the hanger fram 11 extends substantially normal to the hanger arms 15 and 16 and the platform 20 also extends substantially normal to the arms 15 and 16.

Thereafter the hanger frame 11 is placed over a wheel and tire of a vehicle,, with the web 14 behind the upper portion of the tire, the arms 12 and 13 extend from the web 14 to the front of the tire and the arms 15 and 16 and platform 30 all extending outwardly from the front or exposed face of the wheel and the assembly. So positioned, the platform can be used to stand on while cleaning or repairing the vehicle or it can be used as a seat, if desired.

Although a preferred form of my invention has been herein disclosed, it is to be understood that the present disclosure is by way of example and that variations are possible without departing from the subject matter coming within the scope of the following claims, which subject matter I regard as my invention.

I claim:

1. A support platform for vehicles comprising a hanger frame having a pair of spaced apart legs, each interconnected at one of their ends by and adjustable web member;

a hanger arm pivotally connected to the other end of each leg by links fixed to the ends of the legs and pivot pins through the links on each leg and one end of each hanger arm spaced from the upper end portion of said hanger arm, whereby when in unfolded position the other end portions of said spaced part legs abuts against a rear side of said hanger arm; and an arm supported rigid support platform that includes a platform extending across ends of spaced apart platform arms and means pivotally connecting each of said platform arms to an end of a hanger arm remote from the pivot connections of the hanger arms and legs wherein the platform arms are each connected to a hanger arm by links fixed to the platform arm and pivotally connected to the hanger arm at a point spaced from the lower end of said hanger arm whereby the hinged end portion of said platform arms abuts against the front side of said hanger arm when in unfolded position.

2. A support platform as in claim 1, wherein the hanger frame, hanger arm and platform arms are made of square tubing.

* * * * *